United States Patent
Yamashita et al.

(10) Patent No.: US 7,653,273 B2
(45) Date of Patent: Jan. 26, 2010

(54) OPTICAL SWITCH

(75) Inventors: Shinji Yamashita, Kawasaki (JP);
Tsuyoshi Yamamoto, Kawasaki (JP);
Tamotsu Akashi, Kawasaki (JP); Kohei Shibata, Kawasaki (JP); Hirofumi Aota, Yokohama (JP); Osamu Tsuboi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 657 days.

(21) Appl. No.: 11/039,962

(22) Filed: Jan. 24, 2005

(65) Prior Publication Data
US 2006/0093256 A1 May 4, 2006

(30) Foreign Application Priority Data
Oct. 29, 2004 (JP) .............................. 2004-315644

(51) Int. Cl.
*G02B 6/26* (2006.01)
*G02B 6/42* (2006.01)
*G02B 6/28* (2006.01)
*G02B 26/00* (2006.01)
(52) U.S. Cl. .................... 385/18; 385/17; 385/24; 359/238; 359/290
(58) Field of Classification Search .................. 385/18
See application file for complete search history.

(56) References Cited

U.S. PATENT DOCUMENTS

| 5,481,396 | A | 1/1996 | Ji et al. |
| 5,835,256 | A | 11/1998 | Huibers |
| 5,960,133 | A | 9/1999 | Tomlinson ................ 385/18 |

(Continued)

FOREIGN PATENT DOCUMENTS

JP    2000-347065    12/2000

(Continued)

OTHER PUBLICATIONS

Zhang et al.; "A study of the static characteristics of a torsional micromirror"; May 1, 2001; Department of Mechanical Engineering, National University of Singapore.*

(Continued)

*Primary Examiner*—Uyen-Chau N Le
*Assistant Examiner*—Kajli Prince
(74) *Attorney, Agent, or Firm*—Staas & Halsey LLP

(57) ABSTRACT

The optical switch includes: a spectroscopic device which separates wavelength division multiplexed (WDM) light into its component wavelengths; and a plurality of movable reflectors, arranged in a spectral direction at different intervals, for reflecting light of an individual component wavelength separated by said spectroscopic device. With this optical switch, deterioration of the characteristic of the pass band is avoided, so that the pass band characteristic is increased.

22 Claims, 17 Drawing Sheets

Wa < Wb < Wc < Wd < We < Wf < Wg < Wh < Wi

Pa < Pb < Pc < Pd < Pe < Pf < Pg < Ph

U.S. PATENT DOCUMENTS

| | | | |
|---|---|---|---|
| 6,219,015 B1 | 4/2001 | Bloom et al. | |
| 6,263,127 B1 | 7/2001 | Dragone et al. | |
| 6,275,623 B1 | 8/2001 | Brophy | 385/14 |
| 6,342,960 B1 | 1/2002 | McCullough | |
| 6,396,619 B1 | 5/2002 | Huibers et al. | |
| 6,491,404 B2 | 12/2002 | Hill | |
| 6,501,877 B1 | 12/2002 | Weverka et al. | |
| 6,778,728 B2 | 8/2004 | Taylor et al. | |
| 7,286,763 B2 * | 10/2007 | Fishman et al. | 398/82 |
| 7,324,251 B2 | 1/2008 | Tsuboi et al. | |
| 2003/0151824 A1 * | 8/2003 | Nakama | 359/641 |
| 2004/0156581 A1 | 8/2004 | Golub et al. | 385/18 |

FOREIGN PATENT DOCUMENTS

| | | |
|---|---|---|
| JP | 2002-236262 | 8/2002 |
| JP | 2003-294980 | 10/2003 |
| WO | WO 02/075410 | 9/2002 |
| WO | WO 2004/034126 | 4/2004 |

OTHER PUBLICATIONS

X. M. Zhang, et al., "A Study of the Static Characteristics of a Torsional Micromirror", Sensors and Actuators A, vol. 90, May 1, 2001, pp. 73-81.

Japanese Patent Office Notice of Reasons for Rejection mailed Jun. 2, 2009 for corresponding Japanese Patent Application No. 2004-315644.

* cited by examiner

FIG. 3

| PITCH No. | INTERVAL [μm] |
|---|---|
| 1 | 250.0 |
| 2 | 251.4 |
| 3 | 253.0 |
| 4 | 254.4 |
| 5 | 256.0 |
| 6 | 257.6 |
| 7 | 259.2 |
| 8 | 260.8 |
| 9 | 262.4 |
| 10 | 264.2 |
| 11 | 265.8 |
| 12 | 267.4 |
| 13 | 269.4 |

| PITCH No. | INTERVAL [μm] |
|---|---|
| 14 | 271.0 |
| 15 | 273.0 |
| 16 | 274.6 |
| 17 | 276.8 |
| 18 | 278.6 |
| 19 | 280.6 |
| 20 | 282.4 |
| 21 | 284.6 |
| 22 | 286.8 |
| 23 | 288.8 |
| 24 | 291.0 |
| 25 | 293.2 |
| 26 | 295.6 |

| PITCH No. | INTERVAL [μm] |
|---|---|
| 27 | 297.6 |
| 28 | 300.2 |
| 29 | 302.6 |
| 30 | 305.0 |
| 31 | 307.6 |
| 32 | 310.2 |
| 33 | 312.8 |
| 34 | 315.6 |
| 35 | 318.2 |
| 36 | 321.2 |
| 37 | 324.0 |
| 38 | 327.0 |
| 39 | 330.0 |

| PITCH No. | INTERVAL [μm] |
|---|---|
| 40 | 333.4 |
| 41 | 336.4 |
| 42 | 339.8 |
| 43 | 343.2 |

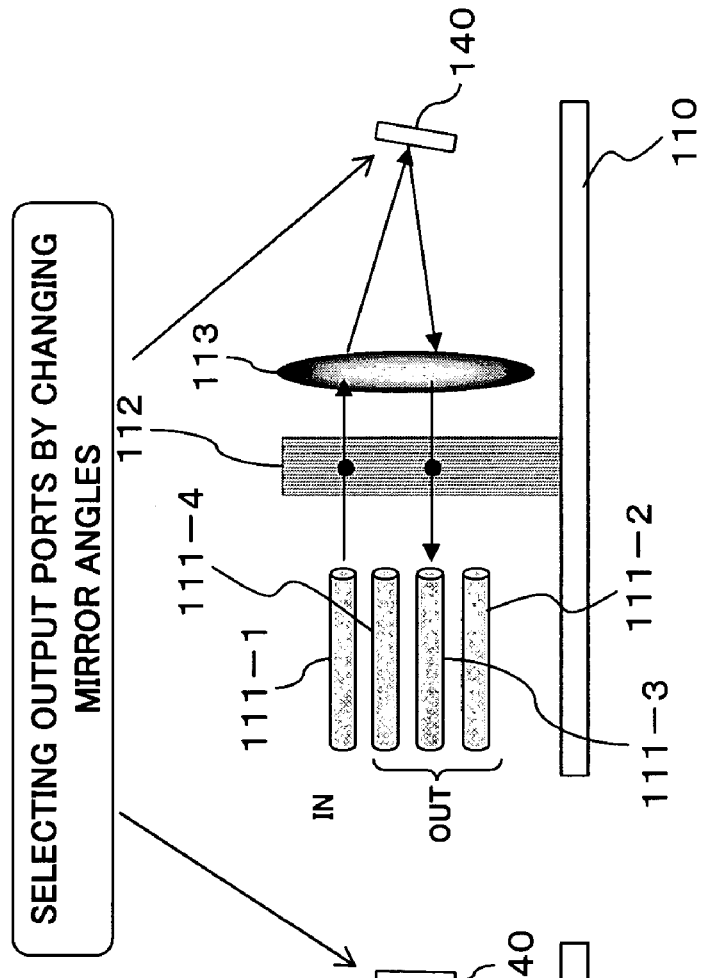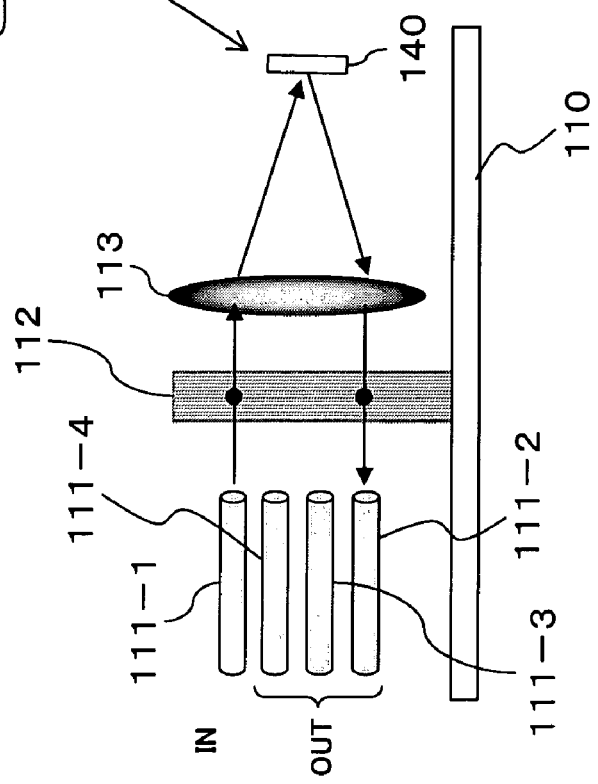
FIG. 13(A)
FIG. 13(B)
SELECTING OUTPUT PORTS BY CHANGING MIRROR ANGLES

OPTICAL SWITCH

CROSS REFERENCE TO RELATED APPLICATIONS

This application is based on and hereby claims priority to Japanese Application No. 2004-315644 filed on Oct. 29, 2004 in Japan, the contents of which are hereby incorporated by reference.

BACKGROUND OF THE INVENTION

1. Field of the Invention

The present invention relates to an optical switch which switches paths by wavelengths.

2. Description of the Related Art

For accommodating vastly increasing internet traffic, optical networks, such as WDM (Wavelength Division Multiplexing) communication systems, are rapidly spreading. Although point-to-point networks are the mainstream of the present WDM, ring-type networks and mesh-type networks will be more developed in the near future, and at each node which forms a network, adding/dropping of arbitrary wavelengths and Optical Cross Connect (OXC), in which conversion into electricity is not performed, will be available, and dynamic path setting/release on the basis of wavelength information will also be available.

An optical switch (hereinafter will be also called the "wavelength-selective switch") which the present invention relates to is placed in a node in a mesh-type network as shown in FIG. 10 and in a ring-type network as shown in FIG. 11 (reference character 100 designates an wavelength-selective switch in FIG. 10 and FIG. 11), and assigns input wavelengths to arbitrary output ports. Here, in the mesh-type network of FIG. 10, reference characters 200 and 300 designate a multiplexing unit and a demultiplexing unit, respectively. In the ring-type network of FIG. 11, reference characters 201 and 301 designate a multiplexing unit for add light and a demultiplexing unit for drop light, respectively.

This assignment function is equal to a function of a cross bar switch for each wavelength as shown in FIG. 9. That is, the wavelength selective switch module (hereinafter will be simply called the "wavelength selective switch) 100 of FIG. 9 includes, for example, demultiplexing units 101 according to the number of input ports corresponding to the input optical paths (input fibers), 2×2 switches 102, and multiplexing units 103 according to the number of output ports corresponding to the output optical transmission paths (output fibers). The demultiplexing unit 101 separates WDM light, input from the input port, by wavelength (channel), and each wavelength is switched (cross or bar switching) by any of the 2×2 switches 102 according to the setting, and any of the multiplexing units 103 multiplexes the wavelength of light with other wavelengths of light, and outputs the WDM light to the corresponding output port.

For example, as shown in FIG. 9, WDM light at wavelengths of $\lambda 2$, $\lambda 5$, and $\mu 6$ is input to input port #1, and WDM light at wavelengths of $\lambda 1$, $\lambda 3$, $\lambda 4$, and $\lambda 7$ are input to input port #2. Light at wavelengths of $\lambda$, $\lambda 4$, and $\lambda 6$ is switched by the 2×2 switches 102, by cross or bar switching, to be output to the output port #1, and light at the remaining wavelengths of $\lambda 2$, $\lambda 3$, $\lambda 5$, and $\lambda 7$ are switched to be output to the output port #2. In FIG. 9, reference character 104 designates a gain equalization (optical attenuator) function. In a wavelength-selective optical switch 100 of a spatial join type, the light is collected onto the output fiber at a position appropriately offset from the center of the core, so that the amount of light coupled to the core is varied.

Specifically, as shown in FIG. 12, a known spatial-join-type wavelength-selective switch 100 has a collimator array 111, which forms an input/output optical system, a spectroscope 112, which forms a spectroscopic optical system for separating input WDM light by wavelength, a collective lens 113, which forms a focusing optical system, and a micro mirror array unit 114, which is a switching device. These elements are formed on a substrate 110.

Here, in the collimator array 111, micro lenses (collimate lens; hereinafter will be simply called the "lenses") are arranged/formed on one side of a glass substrate. On the other side of the substrate, optical fibers are adhered or fused to the positions corresponding to the lenses arranged on the other side so that the optical axes, that is, the centers of the lenses and the centers of the fiber cores, match each other. Light entering a lens from an input optical fiber is converted into collimate light, which is then output to the spectroscope 112. On the other hand, collimate light entering a lens from the spectroscope 112 is focused onto the core of an output fiber. The collimator array 111 of FIG. 12 is a 1-input and 3-output collimator array, which has four optical fibers in total, one input fiber 111-1 which corresponds to an input port, and three output fibers 111-2, 111-3, and 111-4 which correspond to output ports.

The spectroscope 112 reflects incident light in different directions (angles) by wavelength, and it is normally realized by a diffraction grating. FIG. 14 shows a construction of a typical diffraction grating (partially expanded cross sectional view). A diffraction grating is a well-known optical device formed by a glass substrate 120 on which multiple parallel grooves are formed at regular intervals. Utilizing diffraction phenomenon of light, the diffraction grating gives component wavelengths, input at a specific angle ($\alpha$), different angles of emergence ($\beta$). This action makes it possible to separate incident WDM light into its component wavelengths.

The diffraction grating of FIG. 14 has grooves shaped like saw teeth to improve diffraction efficiency, and is called blaze-type diffraction grating. In addition to the diffraction grating of a reflection type of FIG. 14 which reflects incident light, there is another type (transmission-type) of diffraction grating which transmits incident light and realizes a wavelength-separating action equal to the reflective-type diffraction grating. If a transmission-type diffraction grating is employed, collective lens 113 and micro mirror array unit 114 should be arranged after the transmission-type diffraction grating.

The micro mirror array unit 114 functions as a switching device which reflects incident light input from the input fiber 111-1 to any of the output fibers 111-2, 111-3, and 111-4, thereby realizing a port switching function. In the micro mirror array unit 114, micro mirrors (hereinafter will be called "MEMS mirrors") 140 (see FIG. 15), such as MEMS (Micro Electro Mechanical Systems), are arranged in array form. Specifically, MEMS mirrors 140 are provided, one for each of the wavelengths separated by the spectroscope (diffraction grating) 112. Tilt angles of the MEMS mirrors 140 are variable as shown in FIG. 13(A) and FIG. 13(B), and an output port of each component wavelength is determined (switched) according to the tilt angle.

The collective lens 113 collects a wavelength of light separated by the spectroscope 112 to a specific MEMS mirror 140, and it also collects light reflected by any of the MEMS mirrors 140 to output to the collimator array 111 via the spectroscope 112.

With such a construction, in the wavelength-selective optical switch 100, WDM light input through the input fiber 111-1 of the collimator array 111 is converted into collimate light by the above lens, and enters the spectroscope 112. The light output from the spectroscope 112 at different angles by wavelength enters the collective lens 113, which collects the light to the corresponding MEMS mirrors 140 of the micro mirror array unit 114.

The light input to the MEMS mirrors 140 and reflected thereby goes through a different optical path, and enters any of the output fibers 111-2, 111-3, and 111-4 via the collective lens 113 and the spectroscope 112. When the output fibers 111-2, 111-3, and 111-4 to which the reflected light is to be coupled are changed, the tilt angles of the MEMS mirrors 140 are changed as shown in FIG. 13(A) and FIG. 13(B). In this manner, output switching for each wavelength is realized. In addition, by adjusting the tilt angles of the MEMS mirrors 140, the amount of light coupled to the cores of the output fibers 111-2, 111-3, and 111-4 is controlled, so that an optical attenuator function 104, as already described with reference to FIG. 9, is realized as well as the output switching function.

The following Patent Document 2 discloses a wavelength-selective switch 100 employing MEMS mirrors used in OADM.

A pass band is one of the parameters of performance of the wavelength-selective optical switch 100. As schematically shown in FIG. 15, the pass band is determined as the ratio of the diameter of a beam entering a MEMS mirror 140 to mirror width W. If the pass band is wider, the following advantages are obtained:

(1) loss due to deviation of the center wavelength becomes smaller;

(2) the upper limit of the bit rate supported is improved;

(3) the number of wavelength-selective optical switches 100 connected is increased. In other words, if the pass band is narrow, deterioration of optical power due to deviation of the center wavelength is large, so that good transmission characteristic cannot be maintained.

As already described, in the wavelength-selective optical switch 100, after WDM light is separated into its component wavelengths, a focusing optical system (collective lens 113) collimates each wavelength of light and makes the light hit the corresponding MEMS mirror 140. Thus, a relationship as shown in FIG. 16 is established between the spectroscopic optical system (spectroscope 112) and the distance (mirror pitch) between MEMS mirrors 140. That is, as shown in FIG. 16, if a wavelength interval of WDM light is Δλ, and a separation angle of WDM light by the spectroscopic optical system is β, the wavelength separation ability of the spectroscopic optical system is expressed by dβ/dλ, and a separation angle β is given by β=Δλ·(dβ/dλ). Thus, between the distance L between the spectroscopic optical system (spectroscope 112) and the focusing optical system (collective lens 113) and the mirror pitch P, the following relation is established:

$$L = \frac{P}{\Delta\lambda \cdot d\beta/d\lambda}$$

Hence, for obtaining a wide pass band, the beam diameter of the wavelength which hits each MEMS mirror 140 is set as small as possible in comparison with the mirror width W, and the beam should hit the center of the MEMS mirror 140 as much as possible.

As shown in FIG. 14, if an angle (incident angle) formed between the incident light and the diffraction grating normal is α, and an angle (angle of emergence from the diffraction grating) formed between diffraction light and the diffraction grating normal is β, the following relational expression (1) is established:

$$\sin \alpha + \sin \beta = Nm\lambda \quad (1)$$

where N is the number of grooves/mm of the diffraction grating, and m is the diffraction order, and λ is a wavelength.

Here, assuming that the incident angle is constant, if both sides of the equation are differentiated, the following equation (2) is obtained.

$$\frac{d\beta}{d\lambda} = \frac{Nm}{\cos\beta} \quad (2)$$

The both sides of this equation are multiplied by the focal distance $f_L$, and if $f_L \times d\beta = dy$, $$dy = f_L \times \Delta\lambda \times \frac{Nm}{\cos\beta} \quad (3)$$

Here, "dy" is a spatial distance (beam interval) formed by different wavelengths (wavelengths interval Δλ) on the plane of emergence after they pass through the collective lens 113. This equation (3) indicates that the beam interval dy depends on the angle of emergence (diffraction angle β). The appearance of such phenomenon is disclosed in paragraph 0008 through 0010 of the following Patent Document 1.

[Patent Document 1] Japanese Patent Application Laid-Open No. 2003-294980

[Patent Document 2] Specification of U.S. Pat. No. 5,960,133

Accordingly, considering a case where wavelengths of light with a constant wavelength interval dλ are input to a diffraction grating, and where MEMS mirrors 140 are arranged at constant intervals in the spectral direction, since the beam interval dy output from the diffraction grating depends on the wavelength, if adjustment is performed so that a specific wavelength of beam hits the center of a mirror, beam positions of other wavelengths are deviated from the centers of the corresponding mirrors according to the wavelengths, so that the pass band is deteriorated.

FIG. 17 shows a calculation example where a wavelength range in use is a C band (1528.77 through 1563.05 nm), the wavelength interval (dλ) is 100 GHz, the number of wavelengths is 44, the number (N) of grooves of the diffraction grating is 1200/mm, the diffraction order (m) is 1, the incident angle α is 68°, and a mirror pitch is 250 μm. In FIG. 17, dotted line 400 indicates the position of a MEMS mirror 140 (mm) against the channel number (wavelength), and dotted line 500 indicates the beam position (mm) against the channel number, and reference character 600 indicates the pitch (μm) between adjacent channels against the channel number.

FIG. 17 shows that the center position of a beam at each wavelength output from the diffraction grating gradually deviates from the positions (dotted line 400) of the MEMS mirrors 140 arranged at equal intervals. That is, if the focal distance $f_L$ of the collective lens 113 is determined so that the beam interval, after being output from the diffraction grating, between channel number 1 and channel number 2 is 250 μm, the beam interval between channel number 43 and channel number 44 are increased to about 343 μm. In this case, the beam incident position greatly deviates from the center position of the MEMS mirror 140, thereby causing significant deterioration of the pass band.

SUMMARY OF THE INVENTION

With the foregoing problems in view, it is an object of the present invention to provide an optical switch in which deterioration of characteristic of the pass band is avoided to widen the bass band.

In order to accomplish the above object, according to the present invention, there is provided an optical switch, comprising: a spectroscopic device which separates wavelength division multiplexed (WDM) light into its component wavelengths; and a plurality of movable reflectors, arranged in a spectral direction at different intervals, for reflecting light of an individual component wavelength separated by the spectroscopic device.

As one preferred feature, movable reflectors which receive longer wavelengths of incident light are arranged at larger intervals. In addition, it is preferred that the spectroscopic device is a diffraction grating.

As another preferred feature, the optical switch further comprises a focusing optical system which collects the light separated by wavelengths by the spectroscopic device onto the corresponding movable reflectors, and placement interval dy between the movable reflectors is given by $$dy = f_L \times \Delta\lambda \times \frac{Nm}{\cos\beta}$$

where $f_L$ is a focal length of the focusing optical system; $\Delta\lambda$ is a wavelength interval of the WDM light; N is the number of grooves per unit length of the diffraction grating; m is a diffraction order of the diffraction grating; and $\beta$ is an angle of emergence from the diffraction grating.

As still another preferred feature, the shape of each of the movable reflectors depends on the above placement interval.

As a further preferred feature, the widths of the movable reflectors in the spectral direction are set so that the width of a movable reflector reflecting a longer wavelength of light is larger than the width of a movable reflector reflecting a shorter wavelength of light.

As a still further preferred feature, the movable reflectors have a common width in a direction orthogonal to the spectral direction.

As another preferred feature, the distance between the movable reflectors is set so that the distance between movable reflectors which reflect longer wavelengths of light is larger than the distance between movable reflectors which reflect shorter wavelengths of light.

As still another preferred feature, a voltage used to tilt, at a specific angle, the plane of incidence of a movable reflector which reflects a longer wavelength of light is larger than a voltage used to tilt, at the specific angle, the plane of incidence of a movable reflector which reflects a shorter wavelength of light.

As a further preferred feature, the diameter of a rotational axis supporting a movable reflector which reflects a longer wavelength of light is smaller than the diameter of a rotational axis supporting a movable reflector which reflects a shorter wavelength of light.

In the present invention, movable reflectors are arranged in the spectral direction at different intervals. Thus, even if beam intervals are unequal depending on wavelengths due to deviation in the spectral direction, it is still possible to make beams of specific wavelengths hit the centers of the corresponding movable reflectors, whereby deterioration of the characteristic of the pass band is avoided, thereby widening the pass band.

Other objects and further features of the present invention will be apparent from the following detailed description when read in conjunction with the accompanying drawings.

BRIEF DESCRIPTION OF THE DRAWINGS

FIG. 3 is a table showing examples of numeral values of placement intervals at which micro mirrors are arranged in a micro mirror array unit of FIG. 1;

FIG. 13(A) and FIG. 13(B) are views for describing an operation (port-switching operation) of the wavelength-selective switch of FIG. 12;

DESCRIPTION OF THE PREFERRED EMBODIMENT(S)

(A) Description of one Preferred Embodiment

Figure 1:
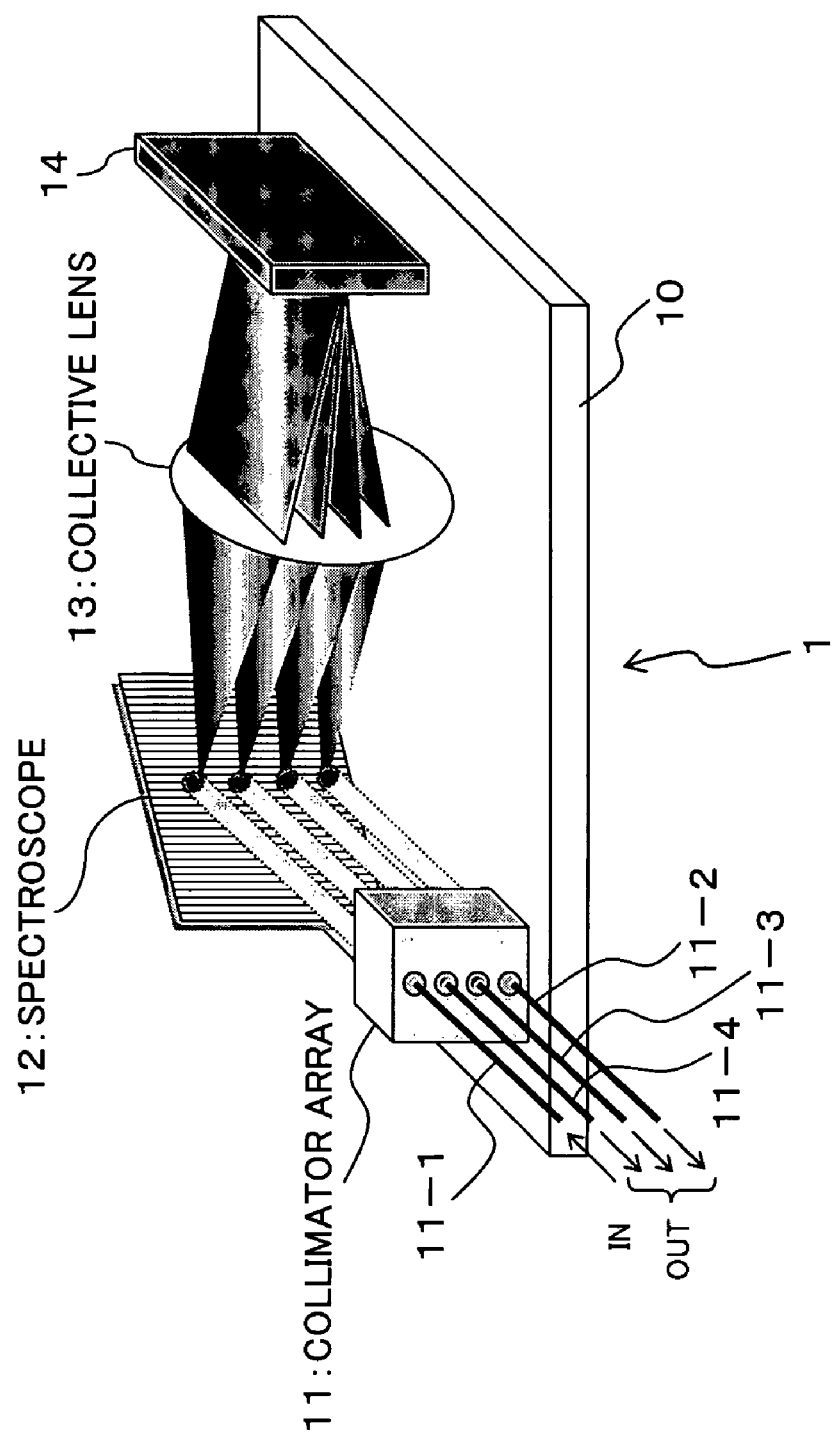
FIG. 1 is a perspective diagram schematically showing an appearance of an optical switch (wavelength-selective switch) according to one preferred embodiment of the present invention.
Figure 12:
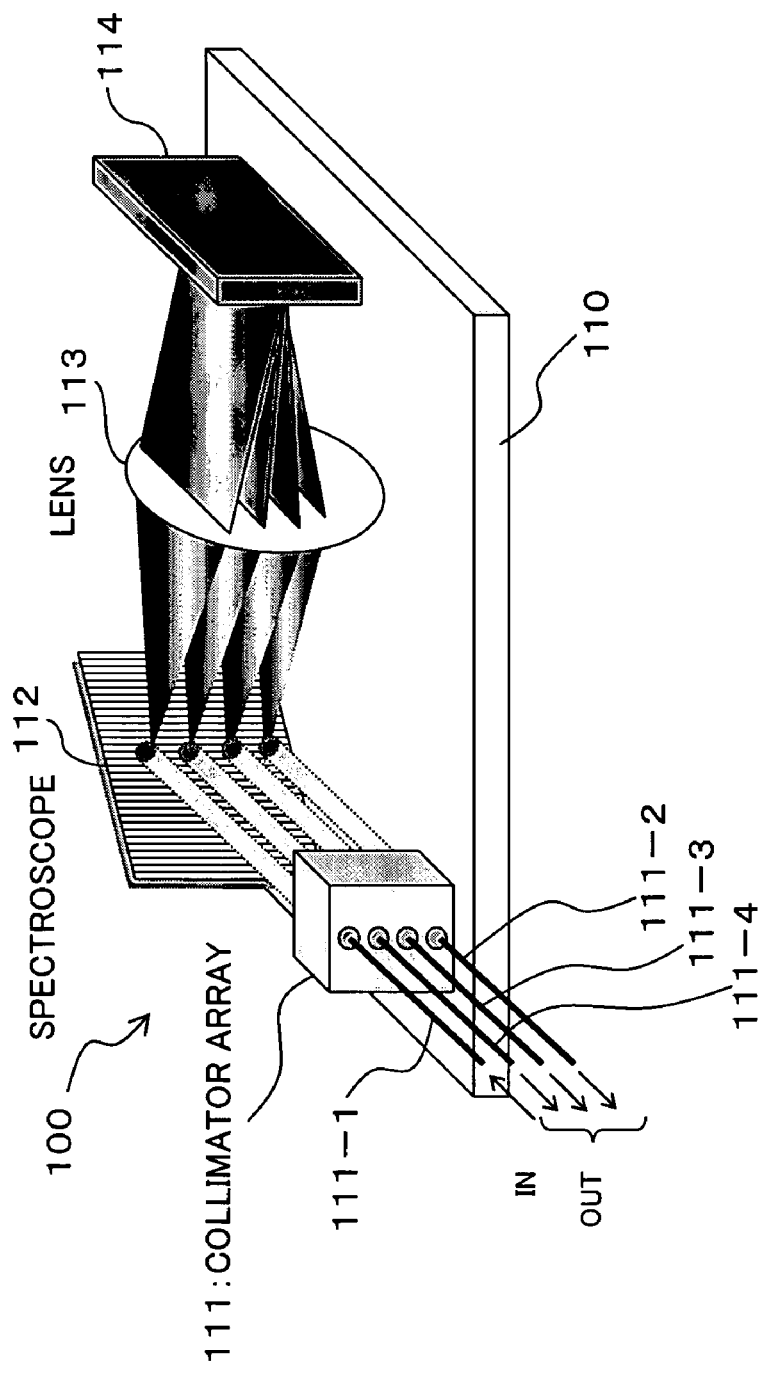
FIG. 12 is a perspective view schematically showing a construction of an essential part of a known special-join-type wavelength-selective switch.

FIG. 1 is a perspective diagram schematically showing an appearance of an optical switch (wavelength-selective switch) according to one preferred embodiment of the present invention. Similar to the previous wavelength-selective switch (see FIG. 12), the wavelength-selective switch 1 of the present embodiment as shown in FIG. 1 includes: a collimator array 11, which forms an input/output optical system; a spectroscope 12, which forms a spectroscopic optical system; a collective lens 13 which forms a focusing optical system; and a micro mirror array unit 14, which is a switching device. These elements are provided on a substrate 10.

In the collimator array 11, micro lenses (collimate lens; hereinafter will be simply called the "lenses") are arranged/formed on one side of a glass substrate. On the other side of the glass substrate, optical fibers are adhered or fused to the positions corresponding to the lenses arranged on the other side so that the optical axes, that is, the centers of the lenses and the centers of the fiber cores, match each other. Light entering the lens from an input optical fiber is converted into collimate light, which is then output to the spectroscope 12. On the other hand, collimate light entering a lens from the spectroscope 12 is collected onto the core of an output fiber. The collimator array 11 of FIG. 1 is also a 1-input and 3-output collimator array, which has four optical fibers in total, one input fiber 11-1 which corresponds to an input port, and three output fibers 11-2, 11-3, and 11-4 which correspond to output ports.

Figure 14:
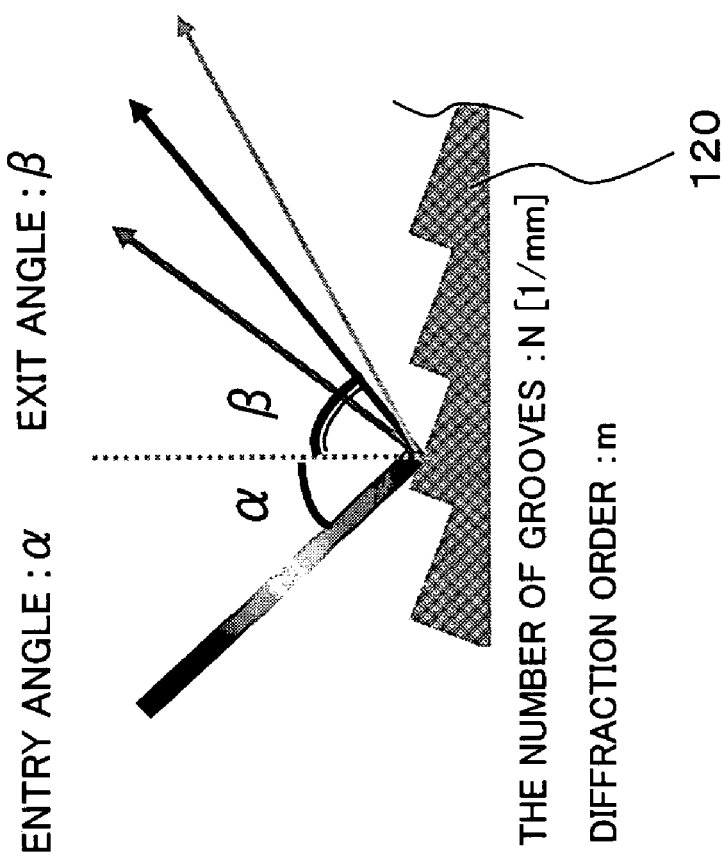
FIG. 14 is a partially magnified sectional view showing a construction of a common diffraction grating which is employed as a known spectroscope.
Figure 15:
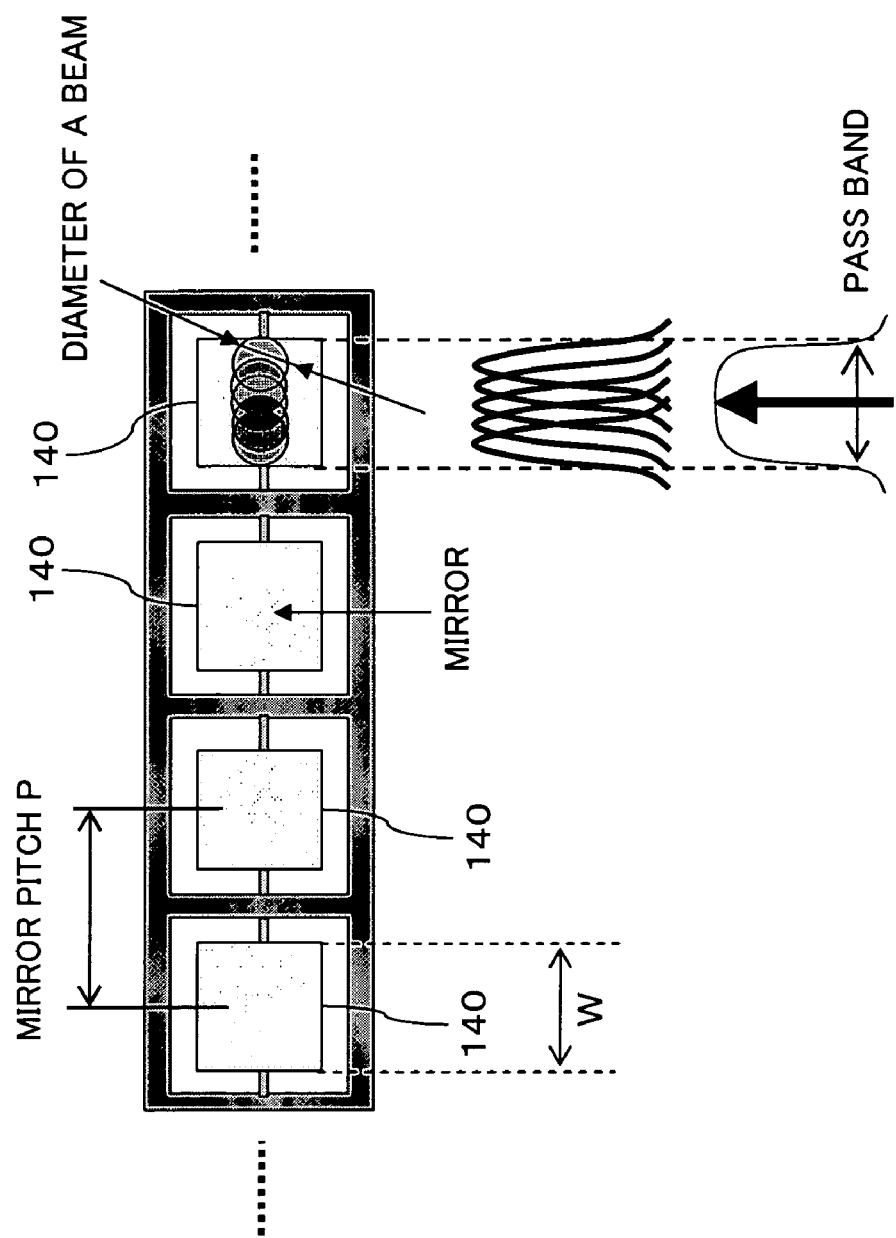
FIG. 15 is a view showing a construction of a micro mirror array unit of FIG. 12.
Figure 16:
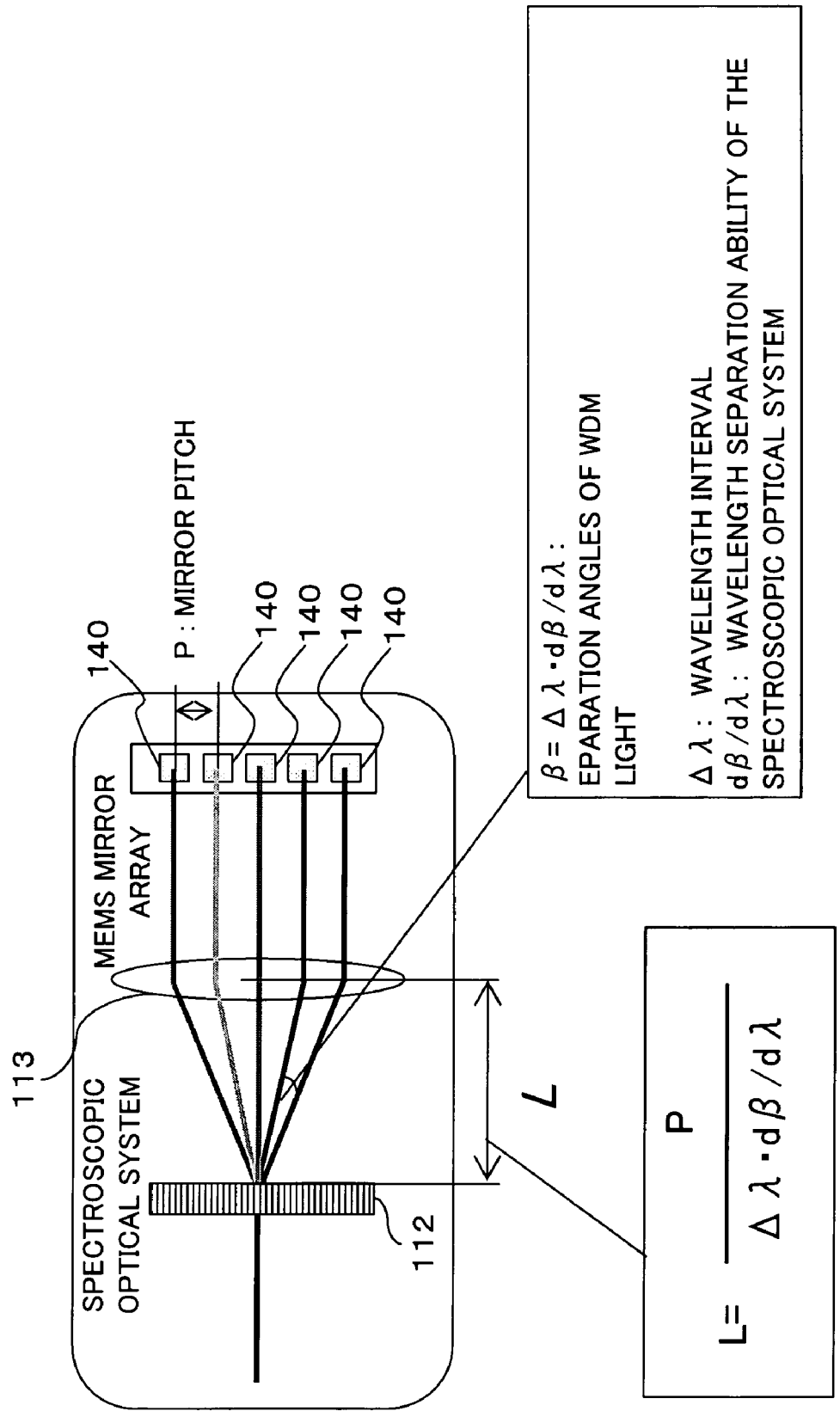
FIG. 16 is a view for describing a relationship between a spectroscopic optical system of a known wavelength-selective switch and a mirror pitch.

The spectroscope (spectroscopic device) 12 reflects incident light in different directions (angles) by wavelength. In the present embodiment, the diffraction grating (blaze-type diffraction grating) previously described with reference to FIG. 14 is also employed. In the resent embodiment, also, both of the reflection-type and transmission-type diffraction gratings are applicable. If a transmission-type diffraction grating is used, the collective lens 13 and the micro mirror array unit 14 should be arranged after the transmission-type diffraction grating. Further, a VIPA (Virtually Imaged Phased Array) with a periodic transmission characteristic is also applicable if a specific non-periodic transmission characteristic portion is used.

The micro mirror array unit 14 serves as a switching device which reflects incident light from the input fiber 11-1 to one of the output fibers 11-2, 11-3, and 11-4, thereby switching the ports. In this example, also, micro mirrors (MEMS mirrors; movable reflectors) manufactured using silicon micro machine technology (MEMS technology) is arranged in array form to form the micro mirror array unit 14. More precisely, MEMS mirrors 41 are prepared, one for each wavelength separated by the spectroscope (diffraction grating) 12.

Figure 2:
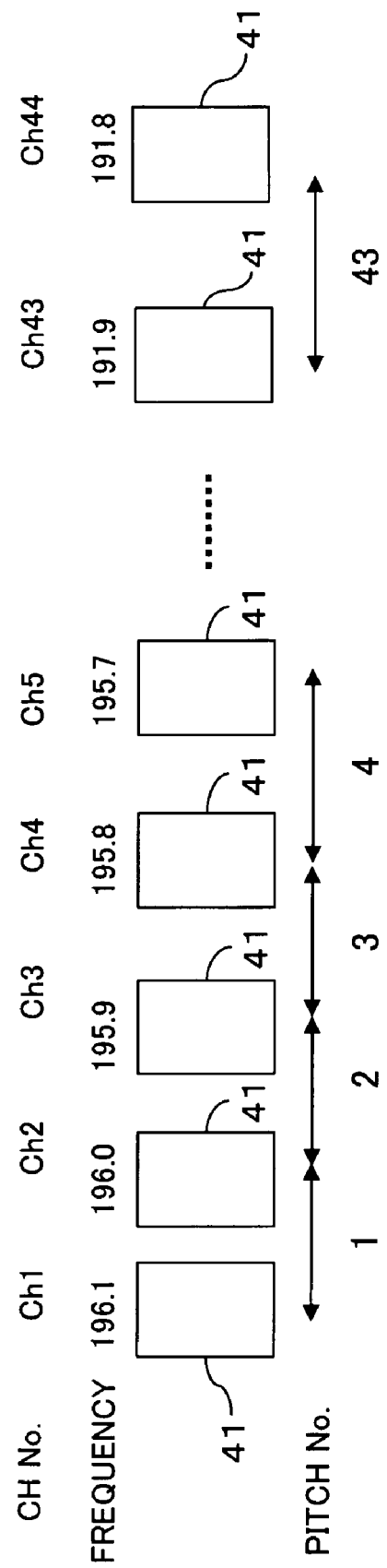
FIG. 2 is a view showing placement intervals at which micro mirrors are arranged in a micro mirror array unit of FIG. 1.
Figure 17:
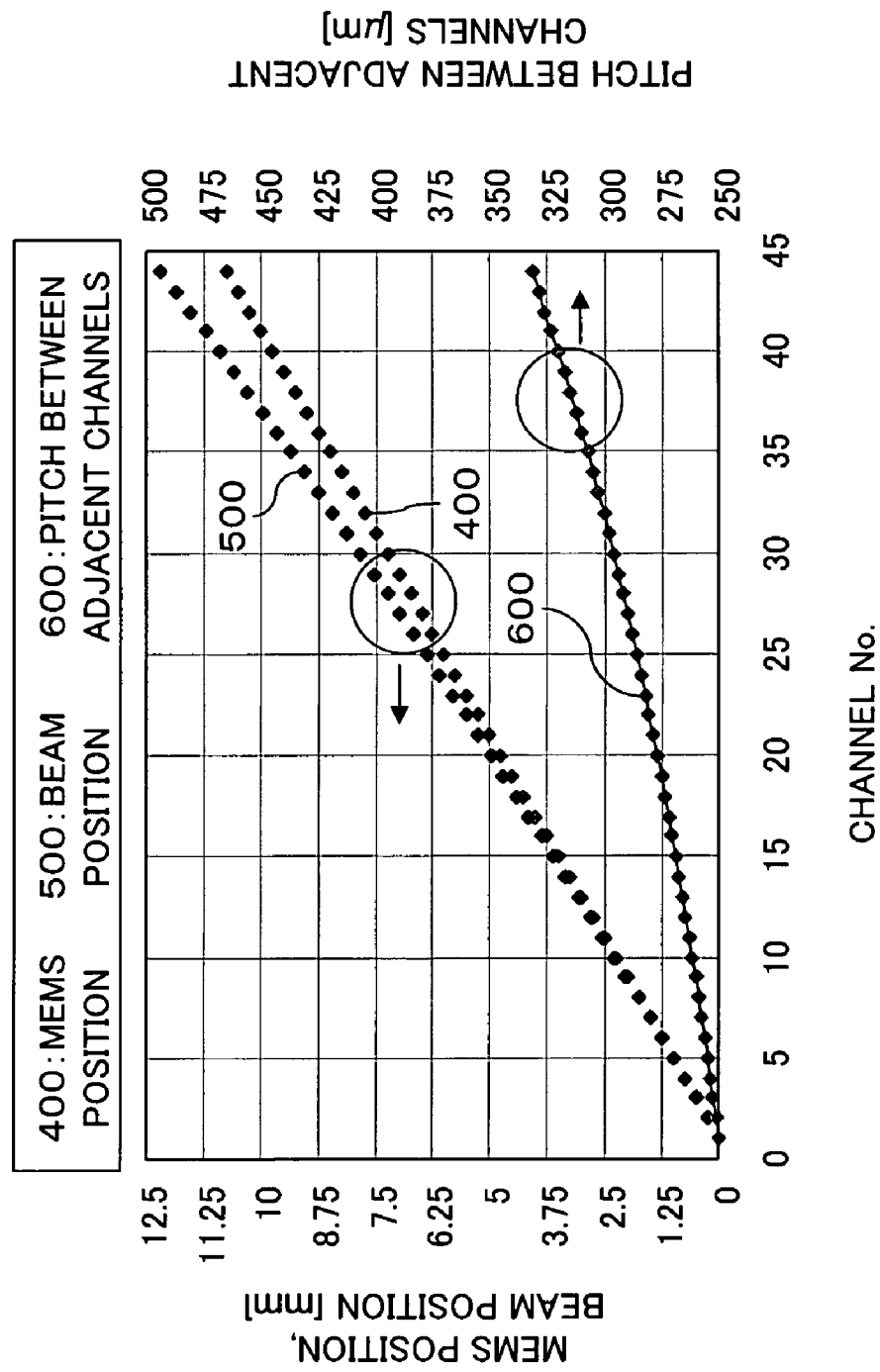
FIG. 17 is a graph indicating a calculation value of beam position deviation amounts from the centers of micro mirrors in a known wavelength-selective switch.

As shown in FIG. 2, in the present embodiment, MEMS mirrors 41 are arranged at different intervals in a spectroscopic direction, not at the same intervals like in the previous micro mirror array unit. That is, the MEMS mirrors 41, one for each wavelength, are arranged so that intervals between the MEMS mirrors 41 match beam intervals output from the diffraction grating 12. In more detail, pitches between the MEMS mirrors 41 are set in accordance with numeral value examples of FIG. 3. The numeral values (pitches) in FIG. 3 are obtained by the following equation under the same calculation condition as described above with reference to FIG. 17. That is, MEMS mirrors 41 which receive longer lengths (that is, low frequency) of incident light are arranged at wider placement intervals (mirror pitch).

$$dy = f_L \times \Delta\lambda \times \frac{Nm}{\cos\beta} \quad (3)$$

In this case, also, in the equation (3), dy is a placement interval of MEMS mirror 41; $f_L$ is a focal distance of the collective lens 13, $\Delta\lambda$ is a wavelength interval of the WDM light; N is the number of grooves per unit length (1 mm) of the diffraction grating 12; m is a diffraction order of the diffraction grating 12; and β is an angle of emergence from the diffraction grating 12. It is clear that there are approximate values for the placement intervals of the MEMS mirrors 41 according to these parameters.

Figure 4A:
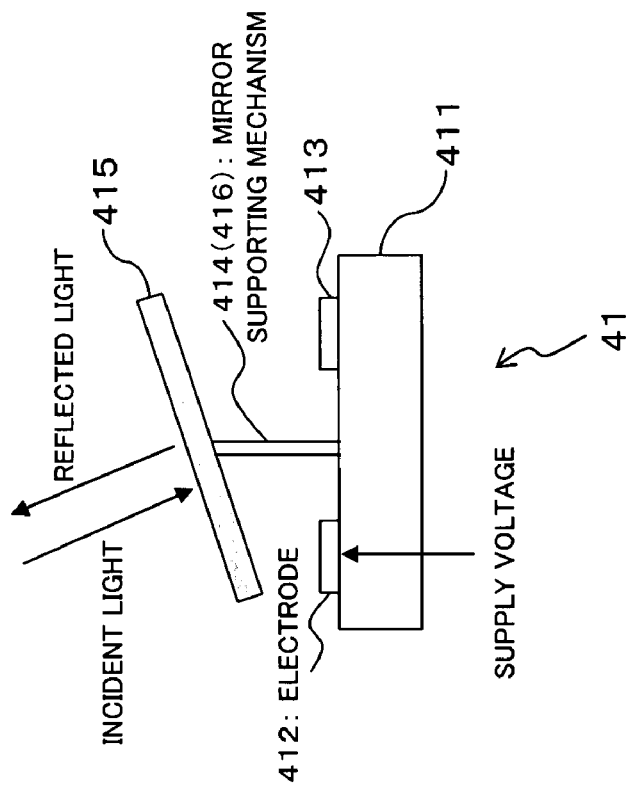
FIG. 4(A) and FIG. 4(B) are views for describing a construction and operation of a micro mirror of the present embodiment.
Figure 4B:
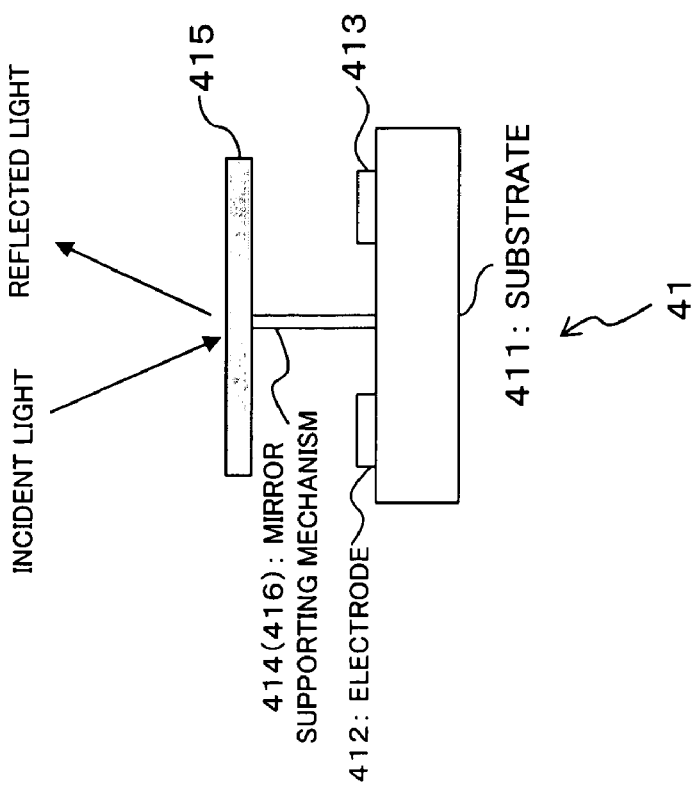

As shown in FIG. 4(A), each MEMS mirror 41 has a mirror supporting mechanism 414 including a torsion bar (rotation axis) 416, a mirror (light reflecting surface) 415 which is supported by the torsion bar 416 so as to be able to be tilted at varying angles, and electrodes 412 and 413 arranged below the electrodes 412, and all these elements are mounted on a silicon substrate 411. At initial condition, the mirror 415 is positioned in parallel with the silicon substrate 411. Under such a condition, if voltage is applied to one of the electrodes 412, as shown in FIG. 4(B), electrostatic power is generated between the electrode 412 and the mirror 415, thus making it possible to control a tilt angle of the mirror 415 by a voltage value. This principle makes it possible to selectively output input light to one of the output ports (output fibers 11-2, 11-3, and 11-4) in the wavelength-selective switch 1.

The mirror supporting mechanism 414 including the torsion bar 416 and the mirror 415 is formed by a semiconductor process, by adding fine processing such as etching to the substrate 411 made of silicon and so on. Using MEMS technology for integrating micro components, it is possible to collectively manufacture micro components, so that downsizing and high-performance of systems are realized.

The collective lens 13 makes wavelengths of light separated by the diffraction grating 12 into parallel light and collects each wavelength of light onto a specific MEMS mirror 41, and at the same time, it collects light reflected from any of the MEMS mirrors 41 and outputs the light to the collimator array 11 via the diffraction grating 12.

With this arrangement, in the wavelength-selective switch 1, WDM light, which is input through the input fiber 11-1 of the collimator array 11, is converted into collimate light by the aforementioned lens, and is input to the spectroscope (diffraction grating) 12, and is output from the diffraction grating 12 at different angles by wavelength. The light is then input to the collective lens 13, which focuses the light onto the corresponding MEMS mirrors of the micro mirror array unit 14.

At that time, as already described with reference to FIG. 2 and FIG. 3, the MEMS mirrors 41 are arranged at different (unequal) intervals so that the intervals between the MEMS mirrors 41, prepared for individual wavelengths (channels), match beam intervals between the beams output from the diffraction grating 12. More precisely, MEMS mirrors 41 which receive longer wavelengths (lower frequency) of light are arranged at larger placement intervals. Thus, if beam intervals are unequal due to deviation in the spectral direction depending on wavelengths, it is still possible to make a specific wavelength of beam hit the center of the corresponding MEMS mirror 41.

Light input to the MEMS mirror 41 and reflected thereby goes through a different light path, passing through the collective lens 13 and the spectroscope 12 again, and enters one of the output fibers 11-2, 11-3, and 11-4, of the collimator array 11 according the tilt angle of the MEMS mirror 41. For selecting output fibers 11-2, 11-3, and 11-4, to which the reflected light is to be coupled, the tilt angle of each MEMS mirror 41 is changed, and this realizes output switching of each wavelength. Here, in the present embodiment, also, the tilt angles of the MEMS mirrors 41 are adjusted to control the amount of light coupled to the cores of the output fibers 11-2, 11-3, and 11-4, thereby realizing both the output switching function and the above-described optical attenuator function.

In this manner, according to the wavelength-selective switch 1 of the present embodiment, since the MEMS mirrors 41 are arranged at different intervals so that the intervals match the beam intervals of the beams output from the spectroscope 12 (MEMS mirrors 41 receiving longer wavelengths of incident light are arranged at larger intervals), it is possible to make a specific wavelength of light hit the center of the corresponding MEMS mirror 41, so that deterioration of the pass band characteristic is avoided, thereby realizing a wider pass band. Accordingly, the following merits are obtained, thereby realizing flexible network design: (1) a loss due to wavelength deviation can be suppressed; (2) the upper limit of the bit rate supported is improved; (3) the number of wavelength-selective switches 1 connected is increased.

(B) Modified Example(s)

(B1) Construction in which the Mirror Size can be Changed

In the above embodiment, the MEMS mirrors 41 (mirrors 415) arranged in the spectral direction have the same shape (mirror size) regardless of the mirror pitches. In MEMS mirrors 41 (MEMS mirrors 41 arranged closer to the right end of the paper of FIG. 5) which receive longer wavelengths of incident light, the angle of emergence from the diffraction grating 12 is steeper, and the amount of movement of the beam in the spectral direction caused by the same angle change is greater. Thus, provided that the size of the MEMS mirrors 41 is the same, MEMS mirrors 41 which receive longer wavelengths of incident light (MEMS mirrors 41 arranged closer to the right end of the paper of FIG. 5) are more susceptible to deterioration of pass band due to deviation of the center wavelength.

Figure 5:
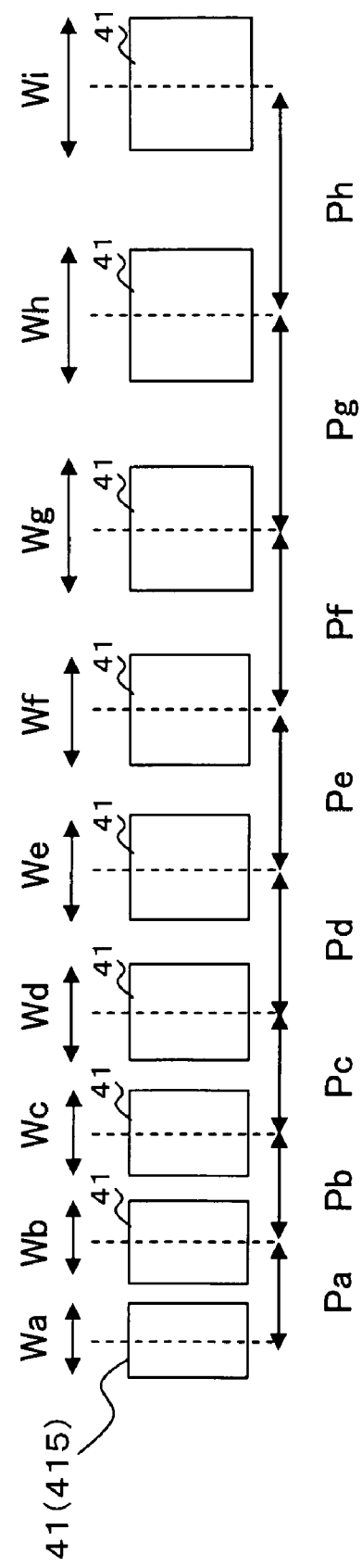
FIG. 5 is a view showing a modified example of the shapes of the micro mirrors of FIG. 2 and placement intervals at which the micro mirrors are arranged.

Hence, the MEMS mirrors 41 are given different shapes (mirror size) according to the mirror pitch. Specifically, as schematically shown in FIG. 5, the mirror size is set so that the wider the mirror pitches (Pa, Pb, Pc, . . . , Ph), that is, the longer the wavelengths of incident light input to the MEMS mirrors 41, the larger (Wa<Wb<Wc<Wd<We<Wf<Wg< Wh<Wi) the widths (mirror widths) in the spectral direction (the lateral direction of the paper of FIG. 5) of the MEMS mirrors 41. With this arrangement, it is possible to suppress pass band deterioration due to deviation of the center wavelength in MEMS mirrors 41 arranged for longer wavelengths.

In this example, only the width of each MEMS mirror 41 in the spectral direction is variable, and the width (mirror height) in the direction orthogonal to the spectral direction is fixed. However, the mirror height can be varied in a similar manner. That is, MEMS mirrors 41 receiving longer wavelengths of incident light have greater mirror areas.

Figure 6:
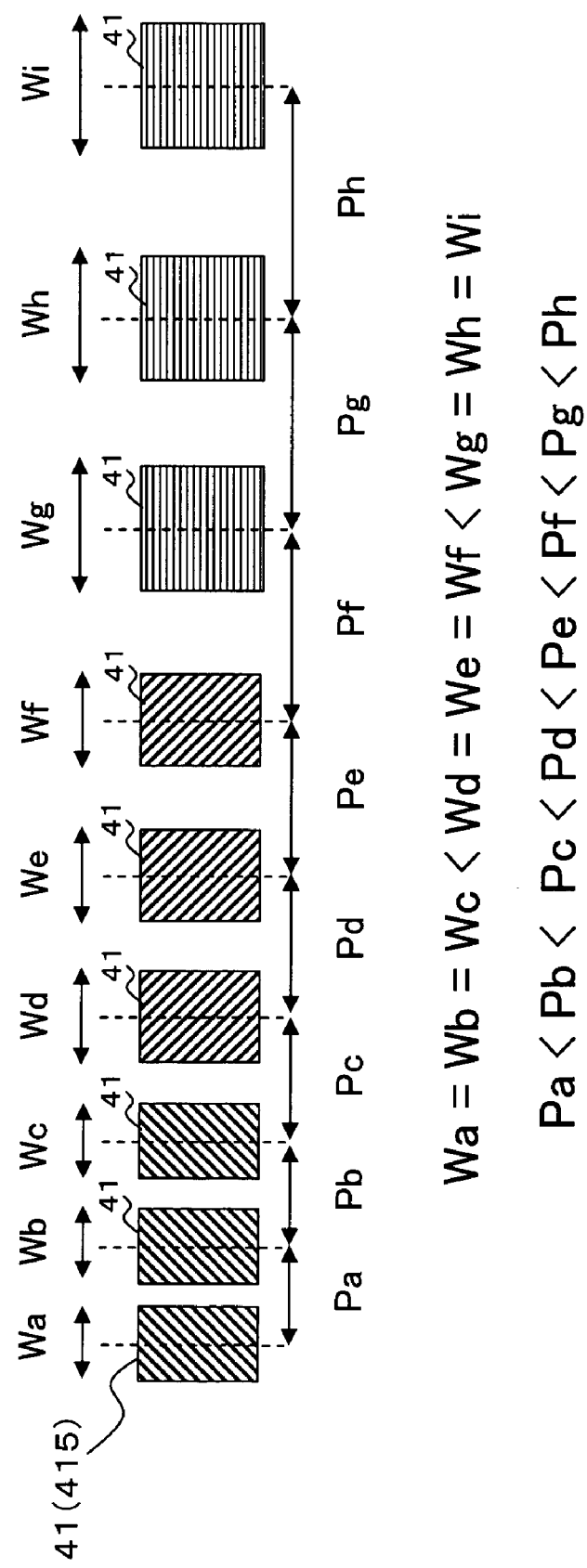
FIG. 6 is a view showing another modified example of the shapes of the micro mirrors of FIG. 2 and placement intervals at which the micro mirrors are arranged.

Further, in the above example, all the MEMS mirrors 41 have different mirror sizes. However, some of the MEMS mirrors 41 can be given the same size. That is, as schematically shown in FIG. 6, the MEMS mirrors 41 arranged in the spectral direction are divided into groups (three groups in FIG. 6, each including three MEMS mirrors 41), and MEMS mirrors 41 included in the same block (a specific division along the spectral direction) share the same shape (mirror width) (Wa=Wb=Wc<Wd=We=Wf<Wg=Wh=Wi). Likewise, the mirror pitch can be set to the same value in the same block (a specific division along the spectral direction).

In this manner, if the mirror width and the mirror pitch are set to the same value in the same block, the number of types of mirrors in need is decreased. Thus, mask design for etching can be simplified, so that manufacture processing and manufacture cost are reduced.

(B2) Driving Method when Mirror Size is Variable

Figure 8:
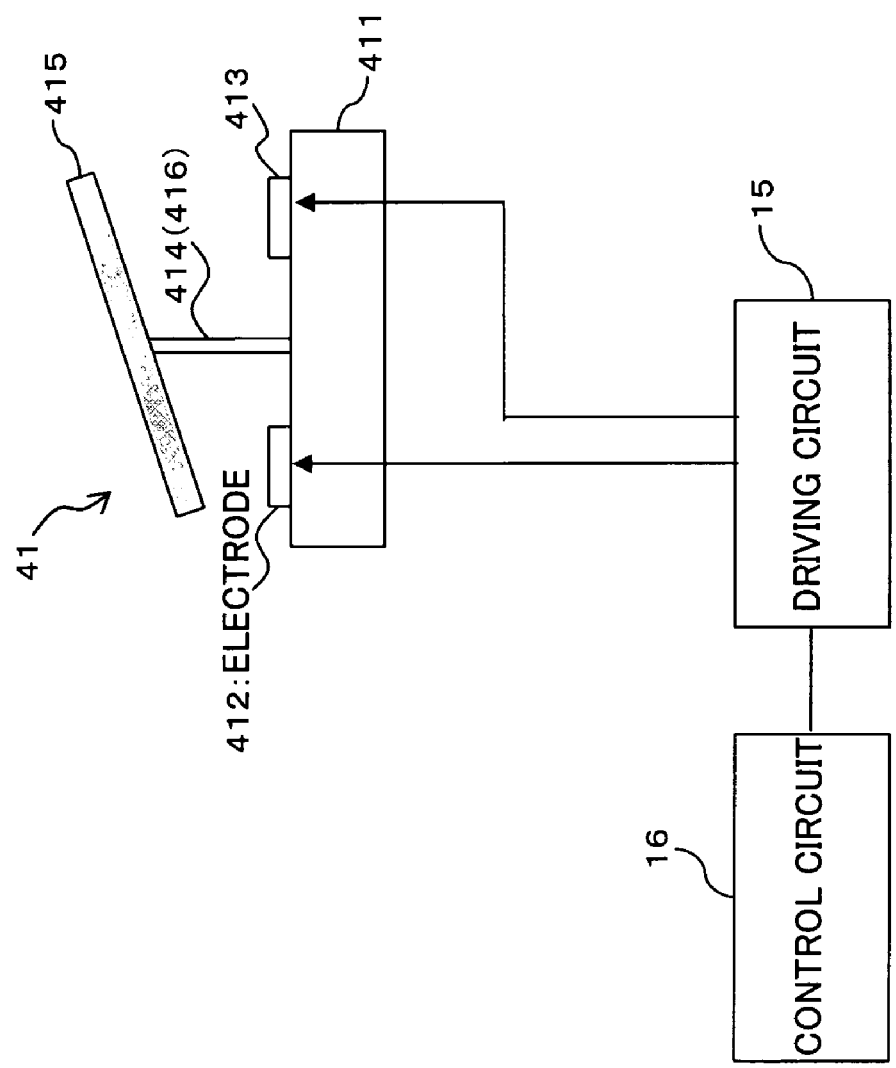
FIG. 8 is a block diagram for describing a method for driving micro mirrors of FIG. 5 and FIG. 6 having different shapes.
Figure 9:
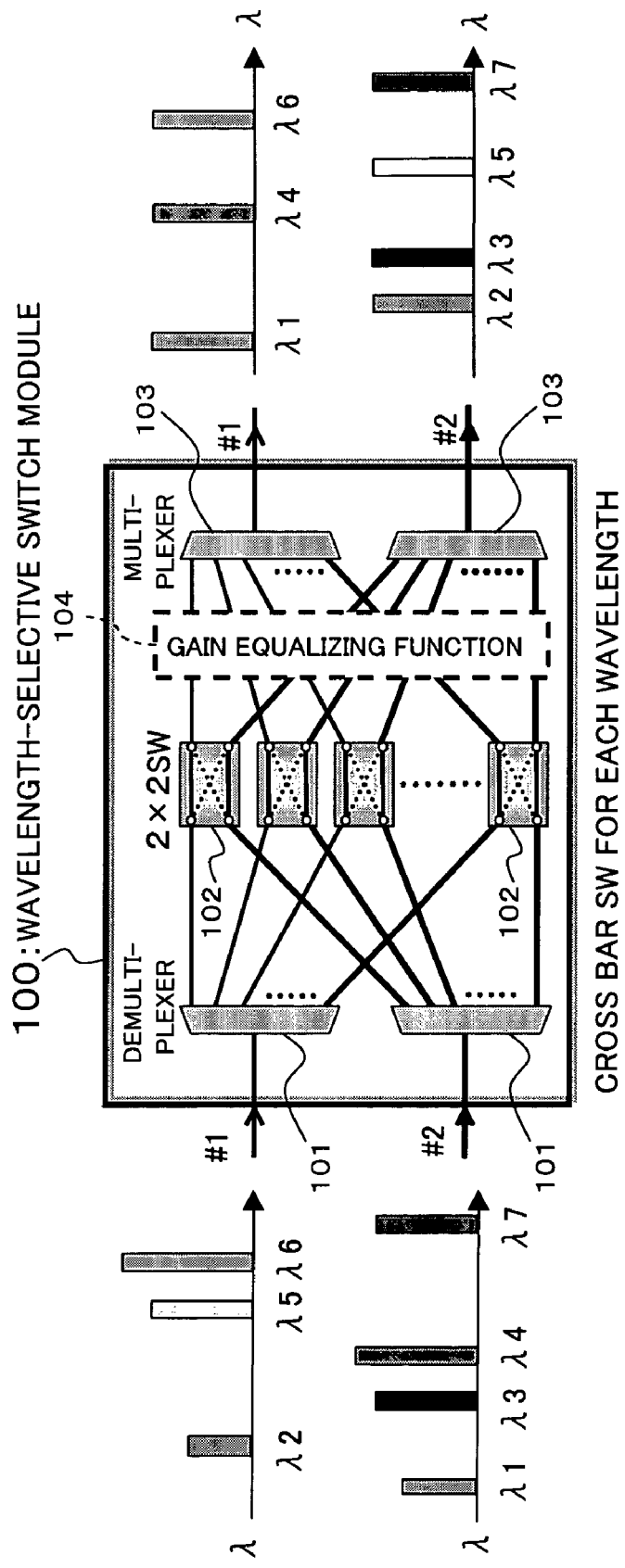
FIG. 9 is a block diagram showing a construction of a previous wavelength-selective switch.
Figure 10:
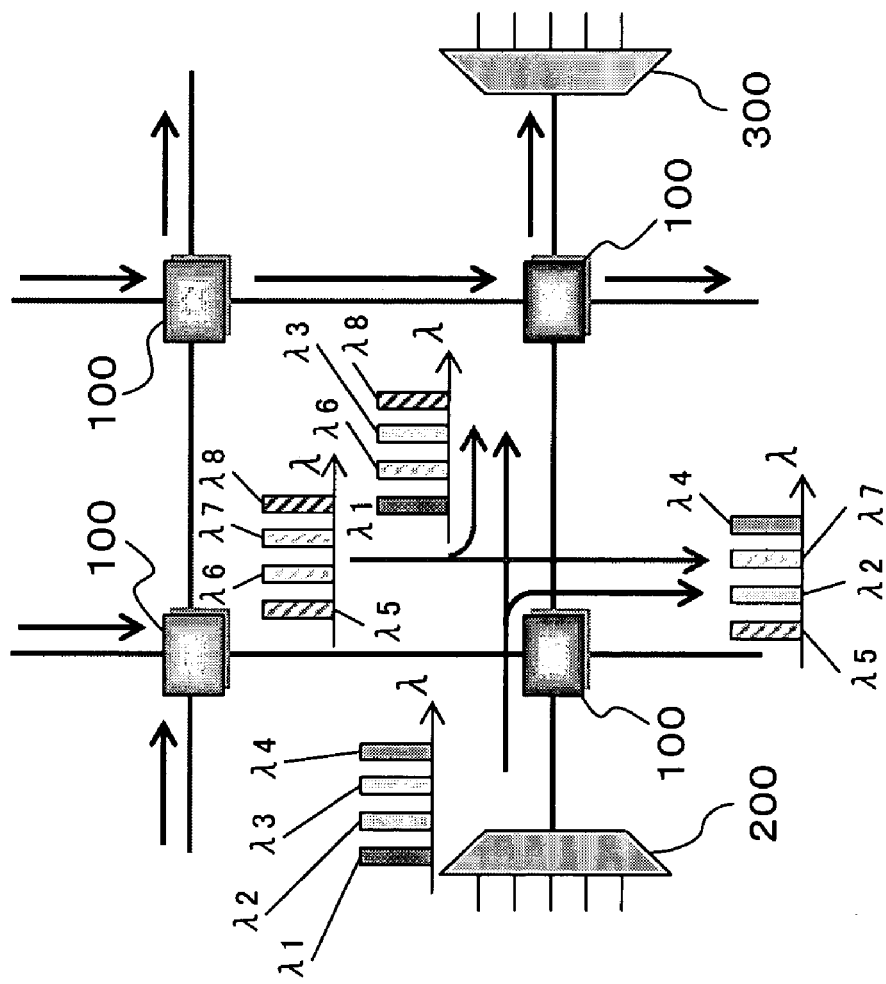
FIG. 10 is a block diagram showing a construction of a mesh-type network to which a previous wavelength-selective switch is applied.
Figure 11:
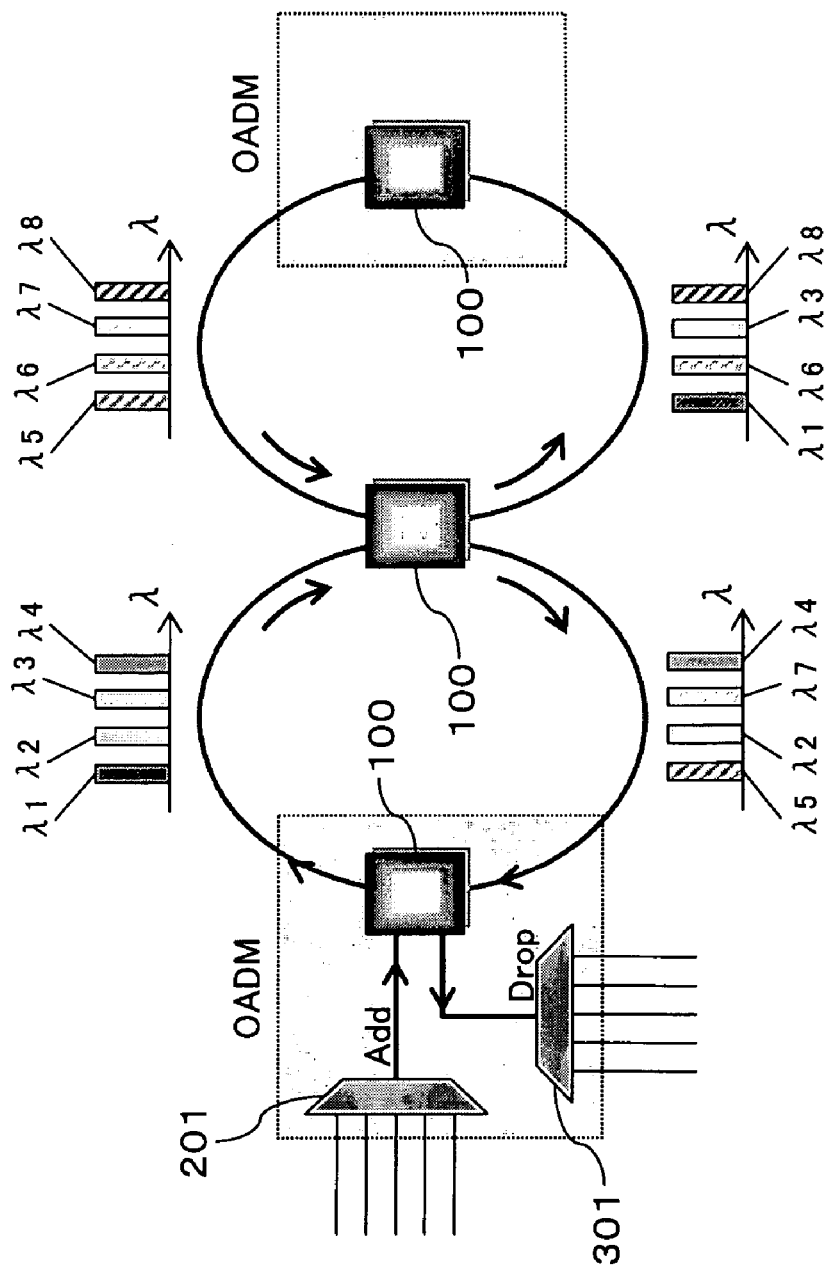
FIG. 11 is a block diagram showing a construction of a ring-type network to which a known wavelength-selective switch is applied.

If the mirror size is variable, as described above, since MEMS mirrors 41 with different sizes reveal different movable resistance when the tilt angle is changed, a driving voltage necessary for obtaining a specific tilt angle varies among such MEMS mirror 41 [assuming that the diameters of rotational axes (torsion bars) 416 supporting the MEMS mirrors 41 are the same]. Hence, as shown in FIG. 8, in MEMS mirrors 41 with different mirror sizes, a control circuit 16 controls a driving circuit 15, which applies driving voltage to the electrodes 412 and 413, to change the driving voltage according to the mirror size, so that the maximum tilt angles of the MEMS mirrors 41 are the same. That is, tilt angles of MEMS mirrors 41 with different shapes are controlled by different driving voltages. Specifically, in the embodiment described above, a voltage to be applied to tilt, at a certain angle, the light reflection surface 415 of a MEMS mirror 41 which reflects a longer wavelength light is set to be larger than a voltage to be applied to tilt, at the same angle, the light reflection surface 415 of a MEMS mirror 41 which reflects a shorter wavelength of light (for example, for each MEMS mirror 41 with different size, voltage values corresponding to tilt angles of MEMS mirrors 41 are stored in a memory).

Figure 7:
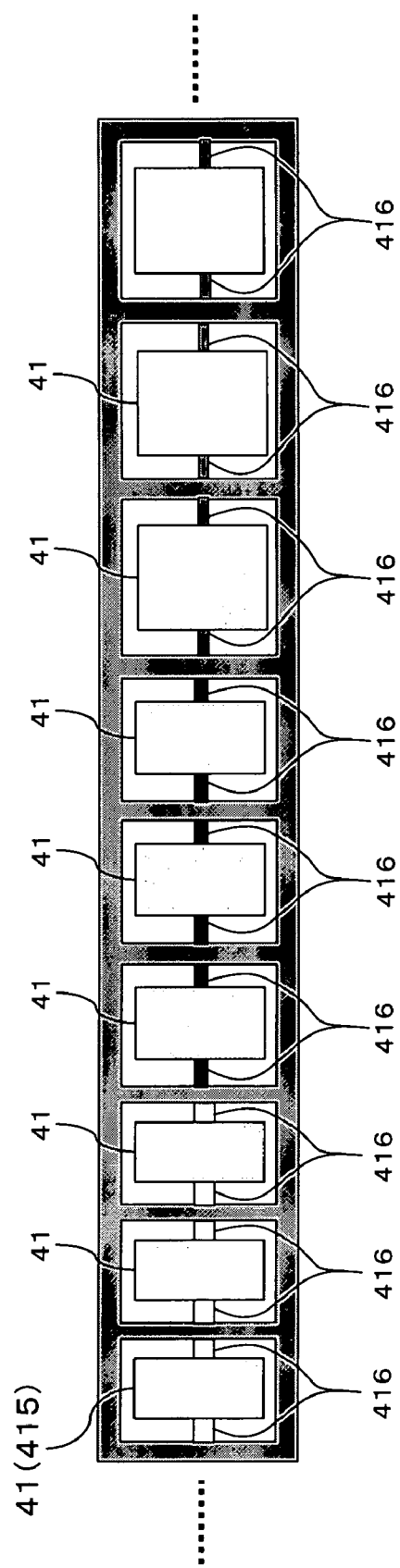
FIG. 7 is a view showing still another modified example of the shapes of the micro mirrors of FIG. 2 and placement intervals at which the micro mirrors are arranged.

On the other hand, even though the mirror size differs, if the movable resistances of the MEMS mirrors 41 are the same, it is possible to obtain the same tilt angle change of the MEMS mirrors 41 having different mirror sizes by using a common driving voltage. Hence, as schematically shown in FIG. 7, in the MEMS mirrors 41 with different mirror sizes, the shapes (cross sectional areas) of the torsion bars 416 are changed according to the sizes of mirrors. More specifically, the greater the sizes of the MEMS mirrors 41 (the longer the wavelengths of light reflected by the MEMS mirrors 41), the smaller the diameters (cross sectional area) of the torsion bars 416 of the MEMS mirrors 41, so that the movable resistances of the MEMS mirrors 41 are the same.

With this arrangement, even if MEMS mirrors 41 have different shapes, their tilt angles are capable of being controlled by a common driving voltage, so that the power consumption, circuit scale, and cost of the wavelength-selective switch 1 is reduced.

For example, voltage values, corresponding to tilt angles, common to MEMS mirrors 41 are stored. When a voltage for tilting any of the MEMS mirrors 41 is obtained, the thus-stored voltage, common to the MEMS mirrors 41, is read out and applied. Here, when fine adjustment is necessary to be performed, such fine adjustment may be executed for each MEMS mirror 41 separately. However, for rough adjustment, application of the above common information stored will improve efficiency.

FIG. 7 is based on the premise that MEMS mirrors 41 arranged along the spectral direction are grouped into a few blocks, and that the MEMS mirrors 41 in the same block share the same mirror size as described with reference to FIG. 6. The MEMS mirrors 41 in the same block have torsion bars 416 of the same shape and the same size. Accordingly, the number of types of MEMS mirrors 41 with torsion bars 416 of different shape is decreased. In this case, also, mask design for etching is simplified, so that manufacture processing and manufacture cost are reduced.

As already described with reference to FIG. 5, if all the MEMS mirrors 41 have their unique mirror size, the shapes of the torsion bars 416 are set so that the movable resistance is the same among the MEMS mirrors 41 (controllable by a common driving voltage). Here, as one method for realizing the same movable resistance, the MEMS mirrors 41 can have mirrors 415 different in weight.

Further, the present invention should by no means be limited to the above-illustrated embodiment, but various changes or modifications may be suggested without departing from the gist of the invention.

What is claimed is:

1. An optical switch, comprising:
   a spectroscopic device which separates a wavelength division multiplexed (WDM) light into component wavelength lights of the WDM light along a spectral direction, the component wavelength lights corresponding, respectively, to adjacent channels; and
   movable reflectors corresponding, respectively, to the component wavelength lights separated by said spectroscopic device, so that each reflector reflects the corresponding component wavelength light,
   wherein the movable reflectors are arranged in the spectral direction so that an interval between any two adjacent reflectors arranged along the spectral direction is different than an interval between any other two adjacent reflectors arranged along the spectral direction.

2. An optical switch as set forth in claim 1, wherein adjacent reflectors which reflect longer component wavelength lights of incident light are arranged at larger intervals than adjacent reflectors which reflect shorter component wavelength lights.

3. An optical switch as set forth in claim 2, wherein said spectroscopic device is a diffraction grating.

4. An optical switch as set forth in claim 3, further comprising a focusing optical system which collects the component wavelength lights separated by said spectroscopic device onto the corresponding movable reflectors,
   placement interval dy between said movable reflectors being given by $$dy = f_L \times \Delta\lambda \times \frac{Nm}{\cos\beta}$$

where $f_L$ is a focal length of said focusing optical system; $\Delta\lambda$ is a wavelength interval of the WDM light; N is the number of grooves per unit length of said diffraction grating; m is a diffraction order of said diffraction grating; and $\beta$ is an angle of emergence from said diffraction grating.

5. An optical switch as set forth in claim 1, wherein said spectroscopic device is a diffraction grating.

6. An optical switch as set forth in claim 5, further comprising a focusing optical system which collects the component wavelength lights separated by said spectroscopic device onto the corresponding movable reflectors,
   placement interval dy between said movable reflectors being given by $$dy = f_L \times \Delta\lambda \times \frac{Nm}{\cos\beta}$$

where $f_L$ is a focal length of said focusing optical system; $\Delta\lambda$ is a wavelength interval of the WDM light; N is the number of grooves per unit length of said diffraction grating; m is a diffraction order of said diffraction grating; and $\beta$ is an angle of emergence from said diffraction grating.

7. An optical switch as set forth in claim 6, wherein the shape of each said movable reflector depends on the placement interval.

8. An optical switch as set forth in claim 7, wherein tilt angles of said movable reflectors with different shapes are controlled by different driving voltages.

9. An optical switch as set forth in claim 7, wherein the lengths in the spectral direction of the planes of incidence of said movable reflectors are set so that the longer the wavelength of incident wavelength component light reflected by a respective movable reflectors, the longer the length at least in the spectral direction of the plane of incidence of the respective movable reflectors.

10. An optical switch as set forth in claim 9, wherein each of said movable reflectors has a shape such that driving voltages of said movable reflectors are the same.

11. An optical switch as set forth in claim 10, wherein tilt angles of said movable reflectors with different shapes are controlled by a common driving voltage.

12. An optical switch as set forth in claim 10, wherein cross sectional areas of rotational axes of said movable reflectors are so set that the longer the lengths in the spectral direction of movable reflectors, the smaller the cross sectional areas of the rotational axes, so that the driving voltages of said movable reflectors are the same.

13. An optical switch as set forth in claim 12, wherein tilt angles of said movable reflectors with different shapes are controlled by a common driving voltage.

14. An optical switch as set forth in claim 1, wherein said movable reflectors are micro mirrors manufactured using micro machine technology.

15. An optical switch as set forth in claim 14, wherein tilt angles of said micro mirrors are controlled by electrostatic power generated by voltage applied to electrodes which are provided for said micro mirrors.

16. An optical switch as set forth in claim 1, wherein some of said movable reflectors, arranged in a specific division along the spectral direction, have the same shape.

17. An optical switch as set forth in claim 1, wherein the widths of said movable reflectors in the spectral direction are set so that the width of a movable reflector reflecting a longer wavelength of light is larger than the width of a movable reflector reflecting a shorter wavelength of light.

18. An optical switch as set forth in claim 17, wherein said movable reflectors have a common width in a direction orthogonal to the spectral direction.

19. An optical switch as set forth in claim 17, wherein the distance between said movable reflectors is set so that the distance between movable reflectors which reflect longer wavelengths of light is larger than the distance between movable reflectors which reflect shorter wavelengths of light.

20. An optical switch as set forth in claim 17, wherein a voltage used to tilt, at a specific angle, the plane of incidence of a movable reflector which reflects a longer wavelength of light is larger than a voltage used to tilt, at the specific angle, the plane of incidence of a movable reflector which reflects a shorter wavelength of light.

21. An optical switch as set forth in claim 17, wherein the diameter of a rotational axis supporting a movable reflector which reflects a longer wavelength of light is smaller than the diameter of a rotational axis supporting a movable reflector which reflects a shorter wavelength of light.

22. An apparatus comprising:

a spectroscopic device receiving a wavelength division multiplexed (WDM) light having a plurality of different wavelength lights multiplexed together and corresponding, respectively, to a plurality of adjacent channels, separating the received WDM light into the different wavelength lights, and dispersing the separated different wavelength lights at different angles, respectively, from the spectroscopic device along a spectral direction;

a plurality of movable reflectors corresponding, respectively, to the plurality of different wavelength lights, and arranged along the spectral direction so that an interval between any two adjacent reflectors arranged along the spectral direction is different than an interval between any other two adjacent reflectors arranged along the spectral direction; and a plurality of output ports, wherein each of the reflectors reflects the corresponding wavelength light and is movable to cause the reflected wavelength light to be output from any of the output ports.

* * * * *

UNITED STATES PATENT AND TRADEMARK OFFICE
CERTIFICATE OF CORRECTION

PATENT NO. : 7,653,273 B2
APPLICATION NO. : 11/039962
DATED : January 26, 2010
INVENTOR(S) : Yamashita et al.

It is certified that error appears in the above-identified patent and that said Letters Patent is hereby corrected as shown below:

Column 11, Line 30, after "lights" delete "of incident light".

Column 12, Line 14, after "of" insert --an--.

Signed and Sealed this

Twentieth Day of April, 2010

David J. Kappos
*Director of the United States Patent and Trademark Office*